United States Patent
Jiang et al.

(10) Patent No.: US 9,964,712 B2
(45) Date of Patent: May 8, 2018

(54) OPTICAL FIBER CONNECTOR

(71) Applicant: Amphenol Fiber Optic Technology (Shenzhen) Co., Ltd., Shenzhen, Guangdong Province (CN)

(72) Inventors: Bo-Lin Jiang, Shenzhen (CN); Song-Sheng Li, Shenzhen (CN); Min Chen, Kaohsiung (CN); Ling-Hua Zhu, Shenzhen (CN)

(73) Assignee: AMPHENOL FIBER OPTIC TECHNOLOGY (SHENZHEN) CO., LTD., Shenzhen, Guangdong Province (CN)

( * ) Notice: Subject to any disclaimer, the term of this patent is extended or adjusted under 35 U.S.C. 154(b) by 0 days. days.

(21) Appl. No.: 15/183,220

(22) Filed: Jun. 15, 2016

(65) Prior Publication Data

US 2017/0153395 A1 Jun. 1, 2017

(30) Foreign Application Priority Data

Nov. 27, 2015 (TW) .............................. 104219068 U

(51) Int. Cl.
*G02B 6/36* (2006.01)
*G02B 6/38* (2006.01)

(52) U.S. Cl.
CPC ........... *G02B 6/387* (2013.01); *G02B 6/3865* (2013.01)

(58) Field of Classification Search
None
See application file for complete search history.

(56) References Cited

U.S. PATENT DOCUMENTS

| 8,376,631 | B2 * | 2/2013 | Milette | G02B 6/3846 385/62 |
|---|---|---|---|---|
| 2010/0046892 | A1 * | 2/2010 | Milette | G02B 6/3846 385/83 |
| 2013/0156384 | A1 * | 6/2013 | Milette | G02B 6/3846 385/81 |
| 2013/0266276 | A1 * | 10/2013 | Li | G02B 6/3898 385/92 |

* cited by examiner

*Primary Examiner* — Sung Pak
(74) *Attorney, Agent, or Firm* — Muncy, Geissler, Olds & Lowe, P.C.

(57) ABSTRACT

An optical fiber connector is for linking a standard connector head member and a lucent connector tail member, and includes a first connecting member and a second connecting member. The first connecting member is adapted to be detachably connected to the standard connector head member, and has a first hollow body that defines a first passage. The second connecting member is adapted to be detachably coupled to the lucent connector tail member, is connected to the first connecting member, and has a second hollow body that defines a second passage. The second passage is in spatial communication with the first passage and has a diameter that is 1.3 millimeters. The first connecting member and the second connecting member are molded as one piece.

1 Claim, 4 Drawing Sheets

OPTICAL FIBER CONNECTOR

CROSS-REFERENCE TO RELATED APPLICATION

This application claims priority of Taiwanese Patent Application No. 104219068, filed on Nov. 27, 2015.

FIELD

The disclosure relates to an optical fiber connector, and more particularly to an optical fiber connector capable of interconnecting a standard connector head member and a lucent connector tail member.

BACKGROUND

Referring to FIGS. 1 and 2, a standard connector (SC) head member 11 is adapted to be connected to an optical fiber cable 12 having a relatively large diameter. A conventional optical fiber connector 13 that has ahead end connected to the standard connector head member 11 typically has a tail end having a relatively large diameter in order to be fittingly connected to a standard connector tail member 14 through which the optical fiber cable 12 extends. The standard connector tail member 14 is, for example, a standard connector boot 141 shown in FIG. 1, or a standard connector crimp ring 142 shown in FIG. 2.

However, when the conventional optical fiber connector 13 is used for connecting to an optical fiber cable which has a relatively small diameter (e.g., 1.2 millimeters) and on which a lucent connector (LC) tail member (e.g., a lucent connector boot or a lucent connector crimp ring) is mounted, the tail end of the conventional optical fiber connector 13 is too large to be fittingly connected to the lucent connector tail member. A separate connecting member is required to be used together with the conventional optical fiber connector 13 for establishing a fitting connection, thereby increasing both manufacturing cost and assembly cost.

SUMMARY

Therefore, an object of the disclosure is to provide an optical fiber connector that can alleviate at least one of the drawbacks of the prior art.

According to the disclosure, the optical fiber connector is for linking a standard connector head member and a lucent connector tail member. The optical fiber connector includes a first connecting member and a second connecting member. The first connecting member is adapted to be detachably connected to the standard connector head member, and has a first hollow body that defines a first passage. The second connecting member is adapted to be detachably coupled to the lucent connector tail member, is connected to the first connecting member, and has a second hollow body that defines a second passage. The second passage is in spatial communication with the first passage and has a diameter that is 1.3 millimeters. The first connecting member and the second connecting member are molded as one piece.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
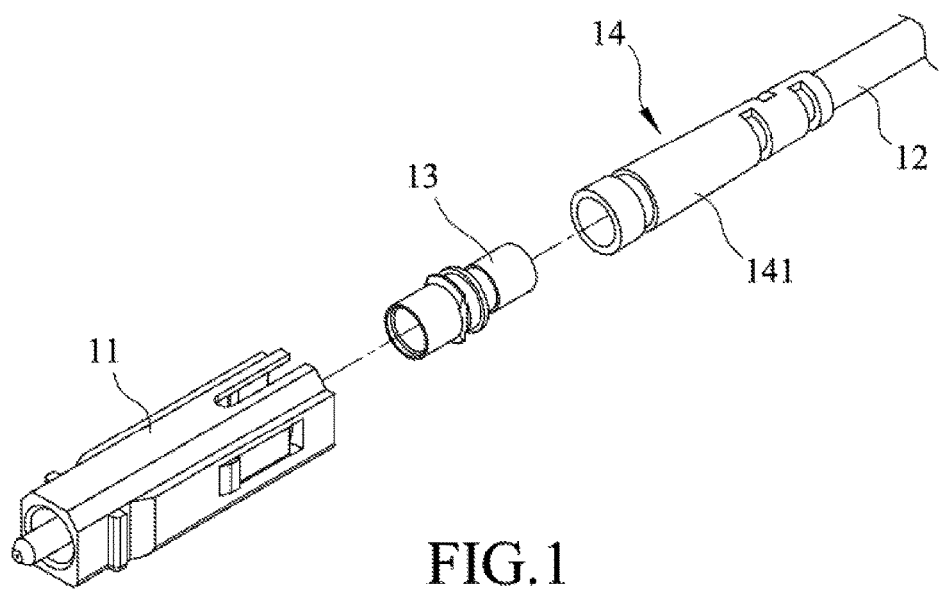
FIG. 1 is an exploded perspective view illustrating a conventional optical fiber connector interconnecting a standard connector and a standard connector boot.
Figure 2:
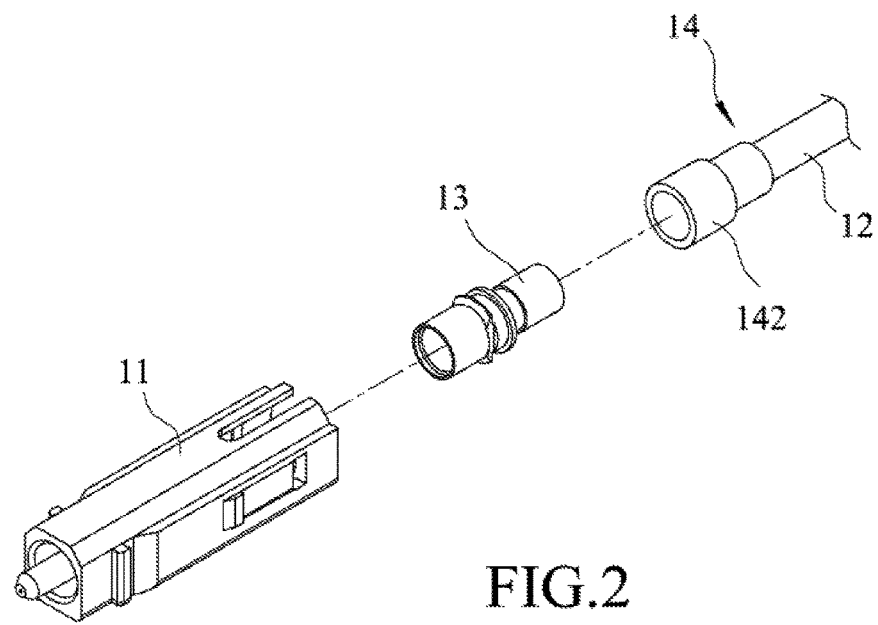
FIG. 2 is a view similar to FIG. 1, but with the standard connector boot substituted by a standard connector crimp ring.
Figure 3:
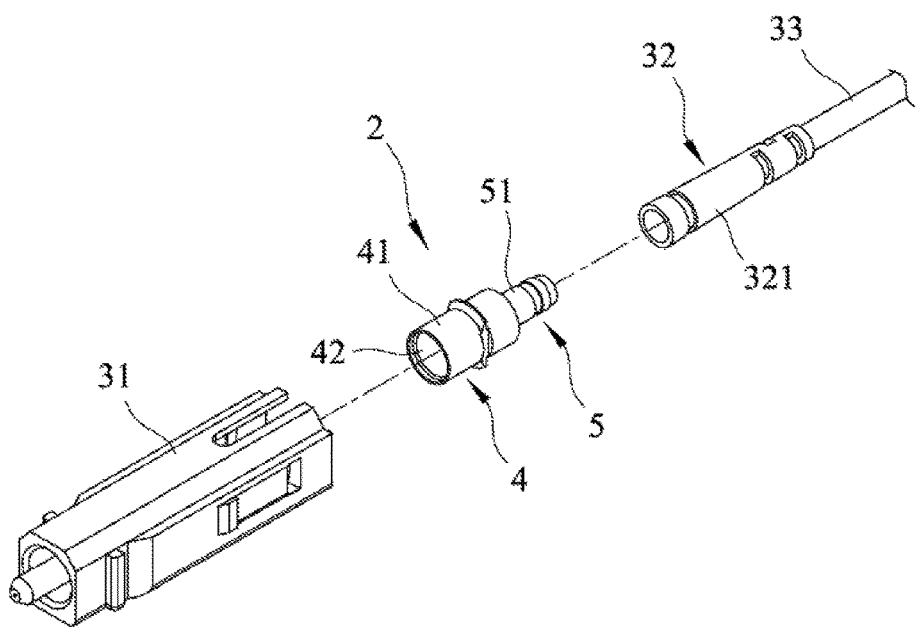
FIG. 3 is an exploded perspective view illustrating an embodiment of an optical fiber connector according to the disclosure interconnecting a standard connector and a lucent connector boot.
Figure 4:
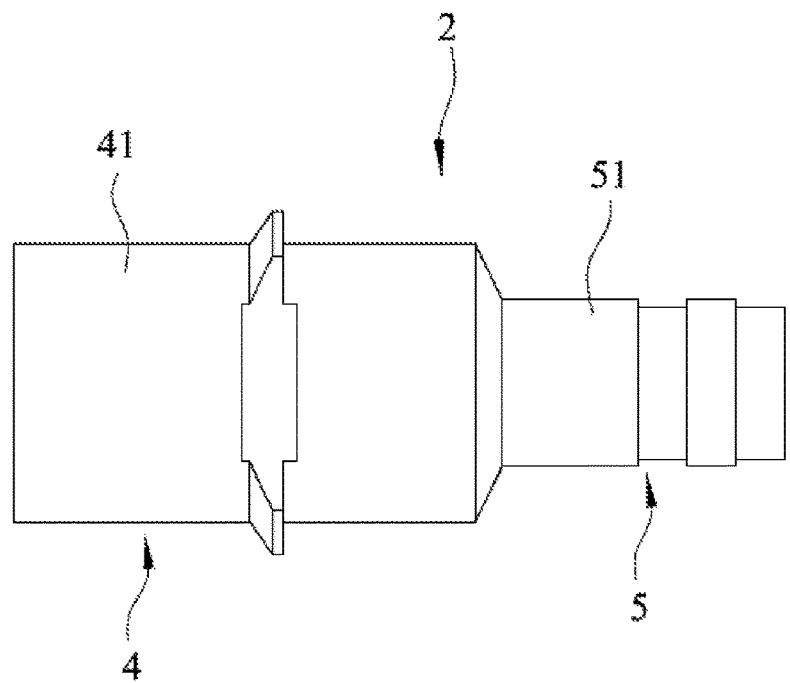
FIG. 4 is a side view of the embodiment.
Figure 5:
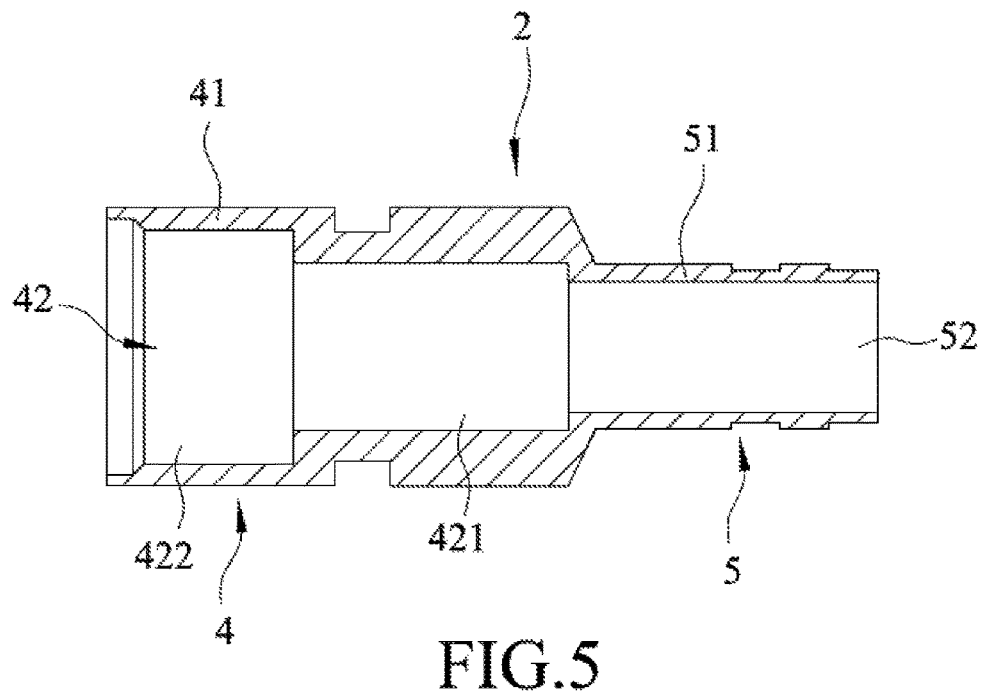
FIG. 5 is a sectional view of the embodiment.

Referring to FIGS. 3 to 5, an embodiment of an optical fiber connector 2 according to the disclosure is for linking a standard connector (SC) head member 31 and a lucent connector (LC) tail member 32, and is for extension of an optical fiber cable 33 therethrough. The optical fiber connector 2 includes a first connecting member 4 and a second connecting member 5.

Figure 6:
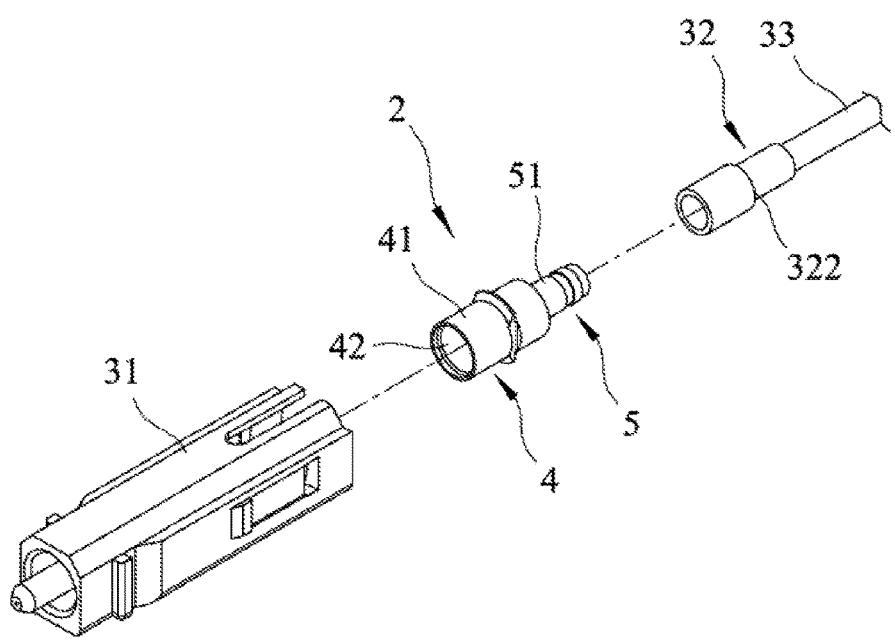
FIG. 6 is a view similar to FIG. 3, but with the lucent connector boot substituted by a lucent connector crimp ring.

The first connecting member 4 is detachably connected to the standard connector head member 31, and has a first hollow body 41 that defines a first passage 42. The second connecting member 5 is detachably coupled to the lucent connector tail member 32. The lucent connector tail member 32 is, for example but not limited to, a lucent connector boot 321 shown in FIG. 3, or a lucent connector crimp ring 322 shown in FIG. 6. The second connecting member 5 is connected to the first connecting member 4, and has a second hollow body 51 that defines a second passage 52. The second passage 52 is in spatial communication with the first passage 42 and has a diameter that is 1.3 millimeters.

In greater detail, as shown in FIG. 5, the first passage 42 of the first connecting member 4 has an inner passage section 421 and an outer passage section 422. The inner passage section 421 is in spatial communication with the second passage 52. The outer passage section 422 is connected to an end of the inner passage section 421 that is opposite to the second passage 52, and has a diameter that is larger than that of the inner passage section 421. In this embodiment, the first connecting member 4 and the second connecting member 5 are molded as one piece.

When in use, the optical fiber cable 33 extends through the first and second passages 42, 52 of the optical fiber connector 2. Since the diameter of the second passage 52 is 1.3 millimeters, the second connecting member 5 permits the optical fiber cable 33, which has a diameter of 1.2 millimeters, to fittingly extend therethrough. Thus the first and second connecting members 4, 5 can be respectively and directly connected to the standard connector head member 31 and the lucent connector tail member 32 that typically have standard sizes. By virtue of the configuration of the first and second connecting members 4, 5 being formed as one piece, a separate connecting member as described in the above-mentioned conventional optical fiber connector 13 is not required. Therefore, the material cost is reduced, and the manufacturing and assembly procedures are simplified as compared with the conventional optical fiber connector 13.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An optical fiber connector adapted for linking a standard connector head member and a lucent connector tail member, said optical fiber connector comprising:

a first connecting member adapted to be detachably connected to the standard connector head member, and having a first hollow body that defines a first passage; and a second connecting member adapted to be detachably coupled to the lucent connector tail member, connected to said first connecting member, and having a second hollow body that defines a second passage, said second passage being in spatial communication with said first passage and having a diameter that is 1.3 millimeters, said first connecting member and said second connecting member being molded as one piece, wherein said first passage of said first connecting member comprises:

an inner passage section being in spatial communication with said second passage of said second connecting member; and an outer passage section connected to an end of said inner passage section that is opposite to said second passage, and having a diameter that is larger than that of said inner passage section.

\* \* \* \* \*